United States Patent
Kazmi et al.

(10) Patent No.: US 9,049,002 B2
(45) Date of Patent: Jun. 2, 2015

(54) NODE AND METHOD FOR UPLINK DETECTION WITH AN ASSIGNED UPLINK PHYSICAL LAYER IDENTITY

(71) Applicant: Telefonaktiebolaget L M Ericsson (publ), Stockholm (SE)

(72) Inventors: Muhammad Kazmi, Bromma (SE); Angelo Centonza, Winchester (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 140 days.

(21) Appl. No.: 13/881,893

(22) PCT Filed: Jan. 11, 2013

(86) PCT No.: PCT/SE2013/050013
§ 371 (c)(1),
(2) Date: Apr. 26, 2013

(87) PCT Pub. No.: WO2014/054998
PCT Pub. Date: Apr. 10, 2014

(65) Prior Publication Data
US 2014/0098753 A1    Apr. 10, 2014

Related U.S. Application Data

(60) Provisional application No. 61/709,813, filed on Oct. 4, 2012.

(51) Int. Cl.
*H04W 4/00* (2009.01)
*H04L 5/00* (2006.01)
(Continued)

(52) U.S. Cl.
CPC ............ *H04L 5/0091* (2013.01); *H04W 8/26* (2013.01); *H04W 84/045* (2013.01)

(58) Field of Classification Search
CPC ..... H04W 80/04; H04W 88/06; H04W 28/04; H04W 72/04
USPC .................................................. 370/328, 329
See application file for complete search history.

(56) References Cited

U.S. PATENT DOCUMENTS

2006/0215625 A1* 9/2006 Hempel et al. ................ 370/342
2010/0008235 A1 1/2010 Tinnakornsrisuphap et al.

FOREIGN PATENT DOCUMENTS

EP    2 271 142 A1    1/2011

OTHER PUBLICATIONS

Huawei et al, "Further Clarification on HNB-GW Disambiguation Based Solutions", 3GPP Draft; R3-120553_DISC_LEGACYUE, 3rd Generation Partnership Project (3GPP), Mobile Competence Centre; 650, Route Des Lucioles; F-06921 Sophia-Antipolis Cedex, France, Mar. 30, 2012.

(Continued)

*Primary Examiner* — Ronald B Abelson

(57) ABSTRACT

Example embodiments presented herein are directed towards the elimination of physical layer identity ambiguities for uplink detection in a wireless network. Some of the example embodiments are directed towards a source network node, and corresponding methods therein, for assigning an unique uplink physical layer identity for a user equipment uplink transmission of a first user equipment being served by the source network node. The unique uplink physical layer identity is provided to ensure that at least one second user equipment, which may be in proximity to a non-serving cell associated with the uplink transmission, does not have a physical layer identity ambiguity with the first user equipment. Some of the example embodiments are also directed towards a target network node, and corresponding methods therein, for performing uplink detection of the first user equipment using the unique physical layer identity described above.

32 Claims, 10 Drawing Sheets

(51) Int. Cl.
*H04W 8/26* (2009.01)
*H04W 84/04* (2009.01)

(56) References Cited

OTHER PUBLICATIONS

Oppolzer et al, "Physical Cell Identifier Assignment in LTE-Advanced Networks", Wireless and Mobile Networking Conference (WMNC), 2012 $5^{th}$ Joint IFIP, IEEE, Sep. 19, 2012, pp. 70-74.
International Search Report and Written Opinion mailed Aug. 22, 2013 in PCT Application No. PCT/SE2013/050013.
3GPP TSG RAN WG3 Meeting #75bis, Re-120467, San Jose del Cabo, Mexico, Mar. 26-30, 2012.
R3-1112600; Qualcomm Incorporated, AT&T, Alcatel-Lucent, IP.access, "Legacy UE Macro to HNB Active Hand-In", 3GPP TSG RAN WG3 #73bis, Zhubai, China, Oct. 10-14, 2011.
3GPP TS 25.331, V10.3.1, $3^{rd}$ Generation Partnership Project; Technical Specification Group Radio Access Network; Radio Resource Control (RRC); Protocol Specification (Release 10) (Apr. 2011).
3GPP TS 25.346, V10.0.0, $3^{rd}$ Generation Partnership Project; Technical Specification Group Radio Access Network; Introduction of the Multimedia Broadcast/Multicast Service (MBMS) in the Radio Access Network (RAN); Stage 2 (Release 10) (Mar. 2011).
R3-112026, 3GPP TSG-RAN3 Meeting #73, Alcatel-Lucent, AT&T, "Macro to Small Cell, Metro Cell Hand-in", Athens, Greece, Aug. 22-26, 2011.
3GPP TR 37.803 V1.2.0, $3^{rd}$ Generation Partnership Project; Technical Specification Group RAN; UMTS and LTE; Mobility Enhancements for H(e)NB (Release 11) (May 2012).
R3-121369, 3GPP TSG-RAN WG3 Meeting #76, Alcatel-Lucent (Rapporteur), "Update to TR37.803 to V1.2.0 with updates from RAN3#76", Prague, Czech Republic, May 21-25, 2012.
3GPP TS 25.215, V10.0.0, $3^{rd}$ Generation Partnership Project; Technical Specification Group Radio Access Network; Physical Layer; Measurements (FDD) (Release 10) (Mar. 2011).
3GPP TS 25.467, V10.2.0, $3^{rd}$ Generation Partnership Project; Technical Specification Group Radio Access Network; UTRAN Architecture for 3G Home Node B (HNB); Stage 2 (Release 10) (Jun. 2011).
3GPP TS 25.367, V10.0.0, $3^{rd}$ Generation Partnership Project; Technical Specification Group Radio Access Network; Mobility Procedures for Home Node B (HNB); Overall Description; Stage 2 (Release 10) (Mar. 2011).

* cited by examiner

NODE AND METHOD FOR UPLINK DETECTION WITH AN ASSIGNED UPLINK PHYSICAL LAYER IDENTITY

This application is the U.S. national phase of International Application No. PCT/SE2013/050013 filed 11 Jan. 2013 which designated the U.S. and claims priority to U.S. Provisional Application No. 61/709,813 filed 4 Oct. 2012, the entire contents of each of which are hereby incorporated by reference.

TECHNICAL FIELD

Example embodiments presented herein are directed towards a target and source network node, and corresponding methods therein, for uplink detection with an assigned unique uplink physical layer identity. The assignment of the unique uplink physical layer identity is provided to eliminate ambiguities of physical layer identities.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus may be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

Emerging mobile network trends may call for denser deployments in urban areas, due to increasing traffic and/or user density. Operators are looking to deploy smaller cells (e.g., pico and femto cells) in the same areas as macro cells, with varying degrees of "cooperation" and/or integration between them according to the desired level of network performance (so-called "HetNet deployments" or heterogeneous network deployments). A significant issue in such deployments is to provide increased/optimum mobility to UEs (user equipment nodes, also referred to as wireless terminals) that have different capabilities while providing/ensuring a reduced/lowest level of core network (CN) involvement, to reduce signaling traffic.

In WCDMA (Wide Band Code Division Multiple Access) systems, a user equipment that supports 3GPP Release 9 or later releases may be able to provide specific measurements to support mobility towards femto cells. In particular, these user equipments may be able to improve mobility towards closed HNB (Home Node B) cells, also known as CSG (Closed Subscriber Group) cells, by providing a Proximity Indication and specific System Information measurements that allow the serving RNC (Radio Network Controller) to disambiguate the target cell and to trigger the appropriate relocation procedures towards the right target. It has to be noted that the term Serving RNC (SRNC) can refer to either a HNB or an RNC.

SUMMARY

Due to the limited number of available Primary Scrambling Codes (PSCs) and to the high number of closed CSG cells potentially present in a HetNet deployment, there is a possibility that a PSC (or any physical layer identity in general) is reused between two or more CSG cells in the same neighborhood. Thus at least one example object of the example embodiments presented herein is to prevent communication failures, for example, during mobility procedures, which result from a physical layer identity being utilized by two or more CSG cells in the same neighborhood. Thus, at least one other example object of some of the example embodiments presented herein may be to provide coordination of uplink PSCs, or physical layer identities in general, used by user equipments in proximity of a cell that might not be uniquely detectable as a target by the source RNC.

Some example advantages that may be provided by the example embodiments may be an improvement on the correct detection of a handover target cell in cases where such a cell is in need of disambiguation, for example, in cases where such a cell is subject to physical layer identity confusion. Another example advantage may be utilizing the knowledge in a source RAN of the mobility state of the user equipment such that the source RAN may evaluate whether the measurements provided by the user equipment for support of target cell identification are likely to be valid by the time they are received by the target RAN and used for target cell disambiguation.

Accordingly, some of the example embodiments may be directed towards a method, in a source network node, for assigning an uplink physical layer identity for a user equipment uplink transmission of a first user equipment being served by the source network node. The method comprises identifying an uplink physical layer identity for the first user equipment is equal to an uplink physical layer identity for at least one second user equipment. The first user equipment is in proximity to a non-serving cell and the at least one second user equipment is in proximity to or being served by the non-serving cell. The method further comprises assigning a unique uplink physical layer identity to the first user equipment such that the unique uplink physical layer identity of the first user equipment does not equal the uplink physical layer identity of the at least one second user equipment. The method also comprises initiating uplink detection for the first user equipment, using the unique uplink physical layer identity.

Some of the example embodiments may be directed towards a source network node for assigning an uplink physical layer identity for a user equipment uplink transmission of a first user equipment being served by the source network node. The source network node comprises processing circuitry configured to identify an uplink physical layer identity for the first user equipment is equal to an uplink physical layer identity for at least one second user equipment. The first user equipment is in proximity to a non-serving cell and the at least one second user equipment is in proximity to or being served by the non-serving cell. The processing circuitry is further configured to assign a unique uplink physical layer identity to the first user equipment such that the unique uplink physical layer identity of the first user equipment does not equal the uplink physical layer identity of the at least one second user equipment. The processing circuitry is further configured to initiate uplink detection for the first user equipment using the unique uplink physical layer identity.

Some of the example embodiments are directed towards a method in a target network node for performing uplink detection for a first user equipment. The method comprises receiving, from a serving network node, a request to perform uplink detection for a first user equipment being served by the serving network node. The request comprises an unique uplink physical layer identity assigned to the first user equipment (101A). the first user equipment is in proximity of a non-serving cell served by the target network node, wherein an uplink physical layer identity of at least one second user equipment was previously in ambiguity with an uplink physical layer identity of the first user equipment. The at least one second user equipment is in proximity to or being served by the non-serving cell. The method further comprises detecting uplink signals transmitted by the first user equipment using the unique uplink physical layer identity.

Some of the example embodiments are directed towards a target network node for performing uplink detection for a first user equipment. The target network node comprises radio circuitry configured to receive, from a serving network node, a request to perform uplink detection for a first user equipment being served by the serving network node. The request comprises an unique uplink physical layer identity assigned to the first user equipment, wherein the first user equipment is in proximity of a non-serving cell served by the target network node. An uplink physical layer identity of at least one second user equipment was previously in ambiguity with an uplink physical layer identity of the first user equipment, wherein said at least one second user equipment is in proximity to or being served by the non-serving cell. The processing circuitry is further configured to detect uplink signals transmitted by the first user equipment using the unique uplink physical layer identity.

DEFINITIONS

3GPP 3rd Generation Partnership Project
A-GNSS Assisted GNSS
ANR Automatic Neighbor Relation
AoA Angle of Arrival
BS Base Station
CDMA Code Division Multiple Access
CFN Connection Frame Number
CGI Cell Global Identity
C-ID Cell Identity
CN Core Network
CSG Closed Subscriber Group
D2D Device to Device
DCH Dedicated Channel
DL Downlink
DMRS Demodulation Reference Signal
DoA Direction of Arrival
DPCCH Dedicated Physical Control Channel
E-UTRAN Evolved UTRAN
GERAN GSM/EDGE Radio Access Network
GSM Global System for Mobile communications
GNSS Global Navigation Satellite System
GW Gateway
HMS HNB Management System
HNB Home Node B
HO Handover
HRPD High Rate Packet Data
LAC Location Area Code
LTE Long-Term Evolution
MSR Multiple Standard Radio
NB Node B
NCI Neighbor Cell Identifier
NMS Network Management System
NRT Neighbor Relation Table
O&M/OAM Operations and Maintenance system
OSS Operational Support Systems
OTD Observed Time Delay
OTDOA Observed Time Difference of Arrival
PCI Physical Cell Identity
PRACH Physical Random Access CHannel
PSC Primary Scrambling Code
PLMN Public Land Mobile Network
RAN Radio Access Network
RAC Routing Area Code
RNC Radio Network Controller
RTT Round Trip Time
Rx Receive/Receiver
SFN System Frame Number
SRNC Serving RNC
SIB System Information Block
Tx Transmit/Transmitter
UE User Equipment
UL Uplink
UTDOA Uplink Time Difference of Arrival
UTRAN Universal Terrestrial Radio Access Network

BRIEF DESCRIPTION OF THE DRAWINGS

The foregoing will be described in more detail with from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments presented herein. However, the example embodiments may be practiced in other manners that depart from these specific details. In other instances, detailed descriptions of well-known methods and elements are omitted so as not to obscure the description of the example embodiments.

General Overview

Figure 1:
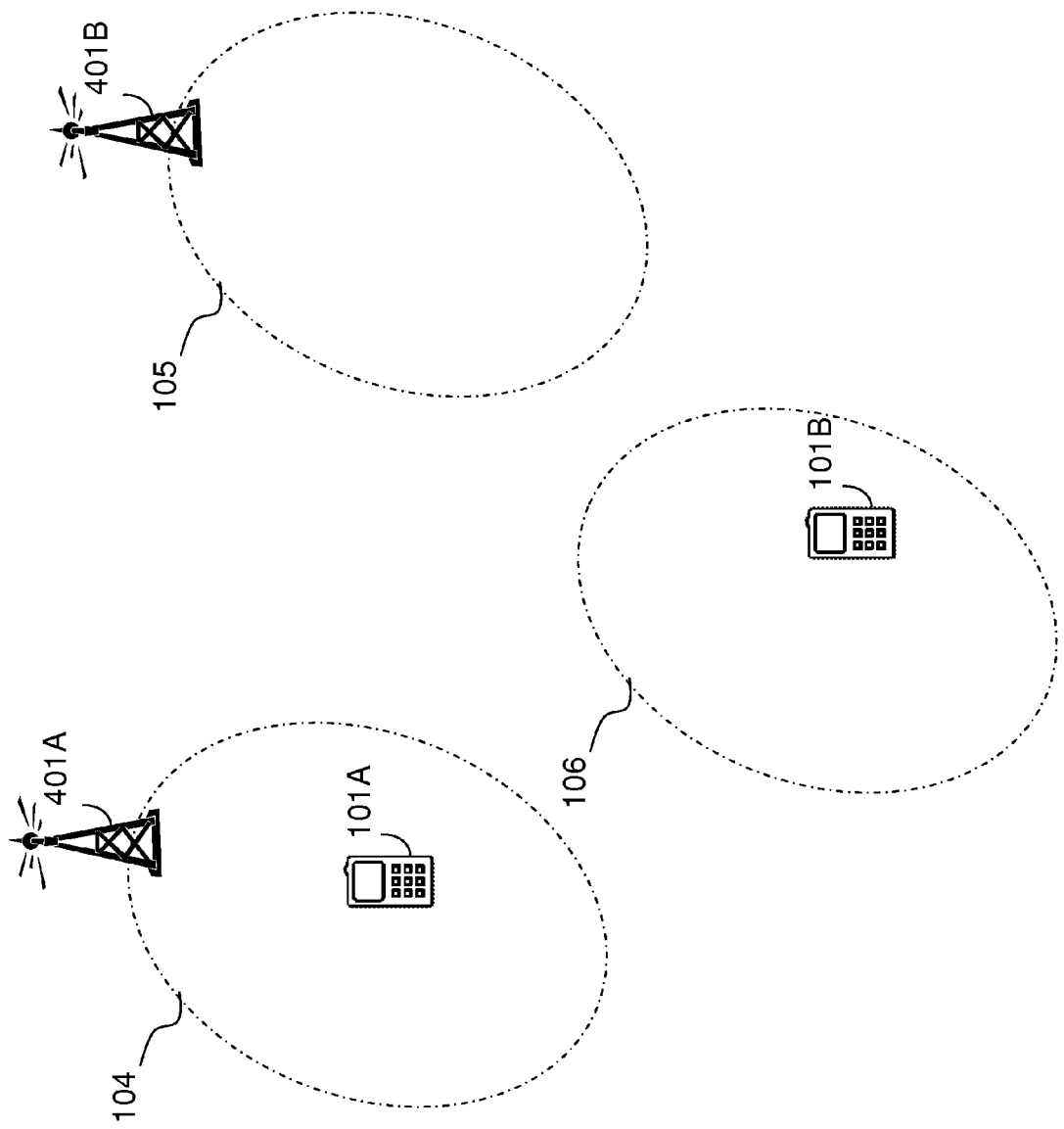
FIGS. 1 and 2 are illustrative examples of a physical layer identity ambiguity.

In order to better explain the example embodiments presented herein, a problem will first be identified and discussed. FIG. 1 illustrates a simplified example of a communications or wireless network. FIG. 1 illustrates a first user equipment 101A which is comprised in a cell 104 served by a serving network node or base station 401A. The user equipment may detect the presence of another base station, for example base station 401B which is associated with another cell 105. The source base station 401A may send a request to the other base station 401B to initiate uplink detection for the first user equipment 101A. The request may comprise a physical layer identity that the other base station, or target base station, 401B may use to identify and detect signals transmitted from the first user equipment 101A.

However, due to the limited number of physical layer identities, it is possible that the first user equipment 101A may be in ambiguity to at least one second user equipment, for example user equipment 101B. The ambiguity may result in the first 101A and the second 101B user equipments comprising a same physical layer identity. In the example provided by FIG. 1, the second user equipment 101B is served by a neighboring serving cell 106. Thus, during the uplink detection, the target base station 401B may use the physical layer identity received in the uplink detection request and mistakenly detect signals from the second user equipment 101B thinking the signals are being transmitted from the first user equipment 101A. Such mistakes due to physical layer identity ambiguities may result in numerous errors, particularly with mobility procedure (e.g., handover procedures).

Figure 2:
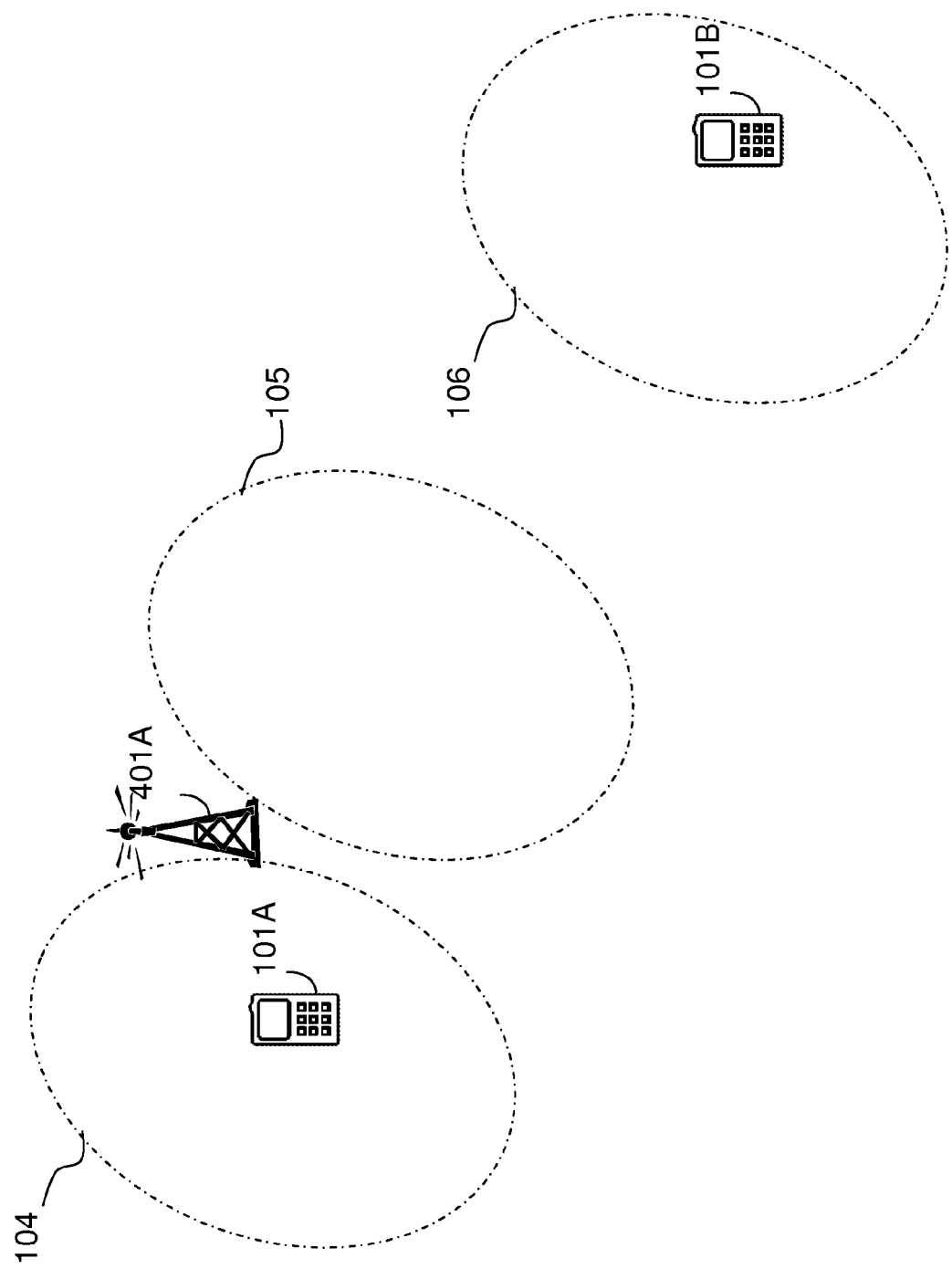

FIG. 2 provides another example of a physical layer identity ambiguity. In the example provided by FIG. 2, a first user equipment may wish to move from a current serving cell (e.g., serving cell 104) to another serving cell (e.g., serving cell 105). Both cells 104 and 105 may be served by the same base station (e.g., base station 401A). Thus, the serving base station 401A may perform uplink detection on the first user equipment 101A using a physical layer identity assigned to the first user equipment 101A. However, in the case of physical layer identity ambiguity, a second user equipment 101B, associated with a neighboring cell 106, may also be transmitting signals. Thus, if the first 101A and second 101B user equipments comprise the same physical layer identities, the base station 401A may mistakenly detect transmitted signals from the wrong user equipment. It should be appreciated that in the examples provided by FIGS. 1 and 2, the second user equipment 101B is in proximity to the base station performing uplink detection. It should be appreciated herein that the term proximity should be interpreted as being able to receive transmitted signals.

Thus, as explained above, a user equipment may be assigned a physical layer identity (e.g., a PSC or PCI) in order to communicate with a network node within a certain cell. In obtaining various measurements, a user equipment may report a to a network node (e.g., base station) a physical layer identity used by the user equipment in communicating with a specific cell.

Information concerning specific measurements performed by Release 9 and later user equipments may be found in *Mobility procedures for Home Node B (HNB), Stage* 2 (Release 10), 3GPP TS 25.367 V10.0.0, 2011-06. Information may further be found in *Radio Resource Control (RRC), Protocol Specification* (Release 10), 3GPP TS 25.331 V10.3.1, 2011-06. A graphical description of how a measurement configuration and reporting occur for a Release 9 or later user equipment handing over to a CSG cell is provided in FIG. 3, from the Mobility procedure for Home Node B.

Figure 3:
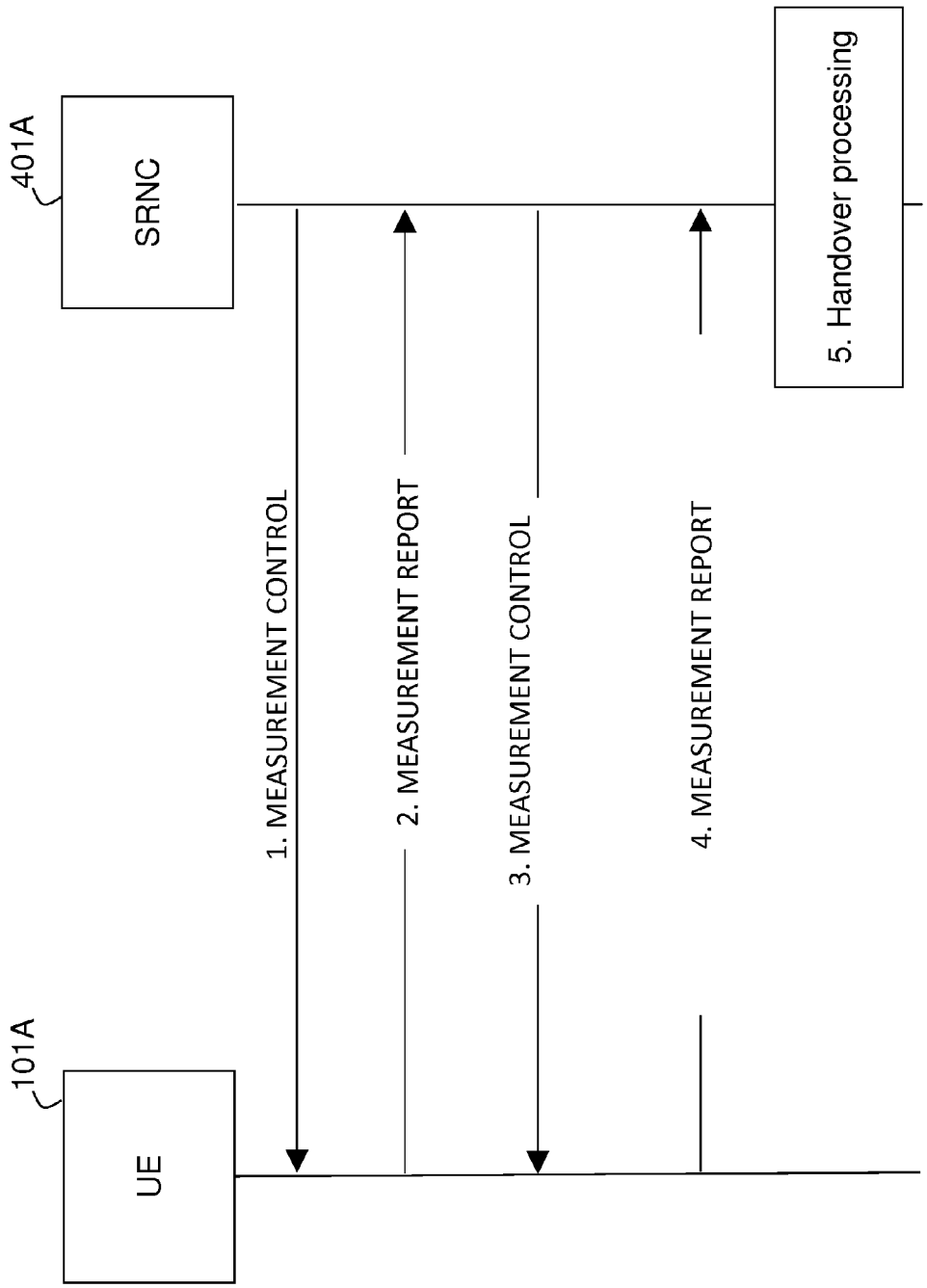
FIG. 3 is a messaging diagram of a measurement configuration in for the handing over a CSG cell.

As shown in FIG. 3, first, the SRNC configures the user equipment to report a CSG Proximity Indication flag (message 1). When reported, this flag indicates that the user equipment is close to an accessible CSG cell. Thereafter, the user equipment reports the Proximity Indication flag due to having determined that it is in proximity of an accessible CSG cell (message 2). Using the examples provided in FIGS. 1 and 2, the first user equipment may report to the SRNC 401A that the user equipment is in proximity to cell 105. CSG cells are restricted to use a limited range of PSCs. This is due to the PSC split applied between closed CSG cells and any other cell. This restriction leads to a physical layer identity ambiguity.

Thus, the SRNC configures measurements at the user equipment as illustrated in FIG. 3 (message 3). This configuration is meant to make the user equipment measure the SIBs of the CSG cell in proximity together with the PSC of such cell. Once the user equipment performs the measurements, it will report the CSG cell information required by the SRNC (message 4). Such information comprises of the following: (1) a CSG cell's PSC; (2) a CSG cell's CSG ID identifying the closed subscribed group to which the CSG cell belongs; (3) a Cell Global Identity uniquely identifying the cell in the PLMN; and (4) a Membership Status providing information regarding the membership of the user equipment in the detected CSG cell. The Membership Status parameter is provided according to the subscriber information the user equipment has provided at that point in time and it can be set to as a "member" or a "non-member". With the information above the SRNC may determine whether the user equipment is allowed in the detected CSG cell and it may unequivocally detect such a cell by means of the CGI.

Figure 4:
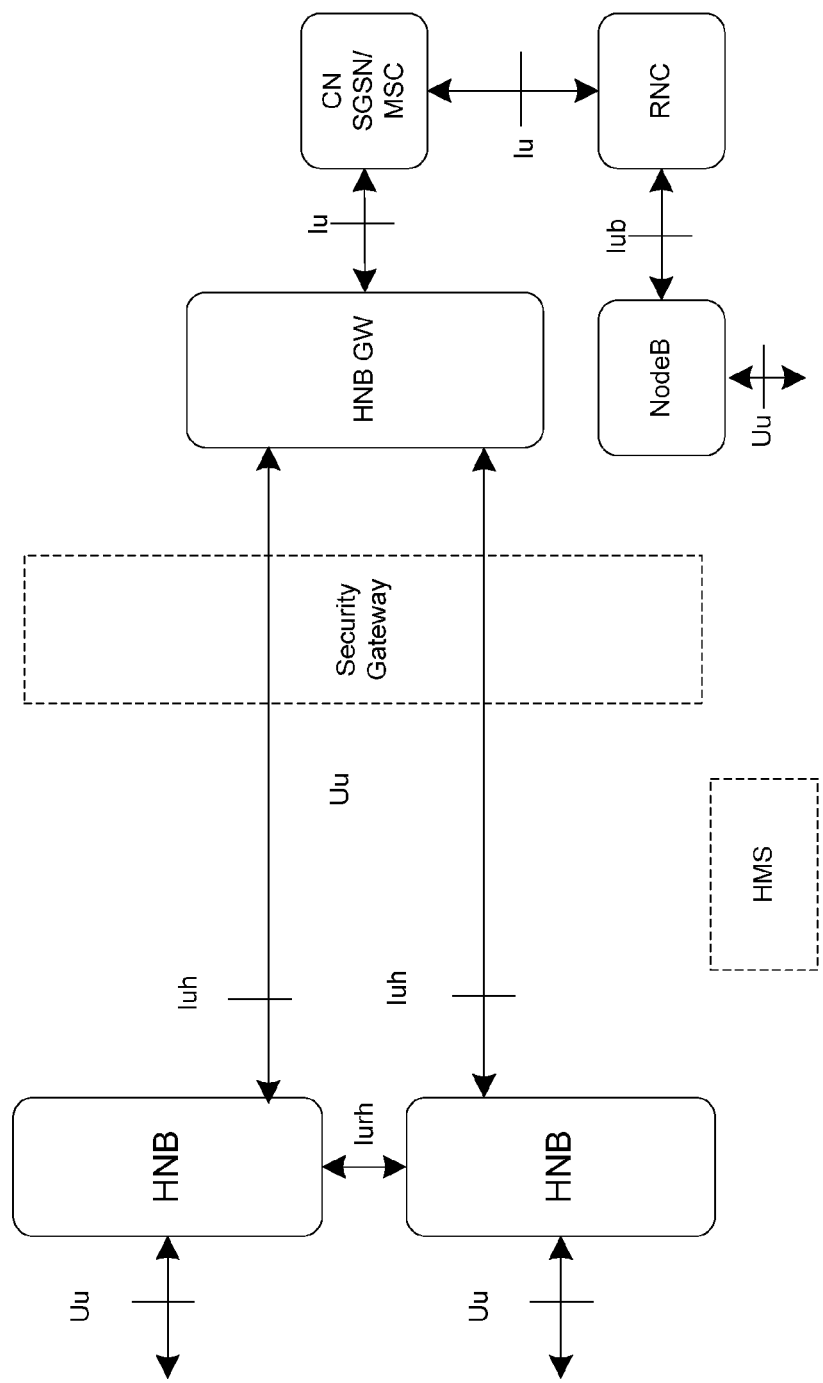
FIG. 4 is an illustrative example of HNB architecture.

For the sake of completeness it shall be mentioned that once the relocation procedures are triggered there can be several different types of signaling procedures that can be followed. According to the architecture shown in FIG. 4, mobility signaling towards a CSG cell may either go through the CN (Iu based mobility) or, in case of a CSG cell to CSG cell mobility, it may be routed via the Iuh interface without passing through the CN.

The scenario addressed by the example embodiments presented herein concern issues affecting pre-Release 9 user equipments or in general user equipments that are not able to acquire SIB information for the purpose of determining the mobility target cell. In other words, the main scenario concerns user equipments that are not able to follow the procedures described in FIG. 3.

Such user equipments will from now on be referred to as "legacy user equipments". For these user equipments it is very difficult to disambiguate the target cell at the SRNC. On the contrary, Release 9 and later user equipments able to acquire SIB information and to disambiguate the target cell will be named non-legacy user equipments.

Legacy user equipments may monitor three mutually exclusive categories of cells (and report their PSCs): active set (cells in soft handover), monitored set (cells not in soft HO, but included in the user equipment's NCL); and detected set (cells detected by the user equipment, which are neither in the monitored set nor in the active set). The detected set reporting is applicable only to intra-frequency measurements in CELL_DCH state for legacy user equipments, but later releases also support inter-frequency measurement of detected cells. A user equipment needs to be able to report the measurements within a) 200 ms for an already identified cell, b) 800 ms for a new cell in the monitored set, and c) 30 s for a new cell in the detected set (TS 25.133). The difference in the detection time requirements of cells in the detected set and the monitored set is due to the user equipment's usage of matched filter measurements to identify the cells, where the filter parameters might be configured for efficient detection of the monitored set only. However, there can be user equipment implementations where the detection time for both the monitored set and the detected set is quite comparable.

As explained above, even if a legacy user equipment is able to report detected set cells PSCs there could be more than one cell using such PSC. Therefore, a means is needed which allows the SRNC to unequivocally identify the target cell corresponding to the PSC reported by legacy user equipments.

A feature that a non-legacy user equipment may support is to be CSG-capable, namely being able to be configured for System Information (SI) acquisition for any detected cell. The latter is a measurement configuration that was standardized to allow user equipments to detect and report System Information of Femto cells not necessarily included in the SRNC Neighbor Cell List.

Release 9 and later user equipments may be able to be configured to report a Proximity Indication flag, signaling that there is an accessible CSG cell in proximity. Further, these user equipments can be configured to report, once the CSG cell in proximity is detected, the PSC, CGI, CSG ID and Membership Status of such CSG cell.

With the information above, reported by the user equipment, the SRNC is able to uniquely identify the target cell to which the user equipment shall be handed over and it is able to correctly construct mobility messages that can unequivocally trigger preparation of resources at the target before the user equipment relocates.

Alternatively, the mechanisms allowing mobility to target cells used for all user equipment releases is based on the SRNC to broadcast over the serving cell a list of neighbor cells, also known as the Neighbor Cell List (NCL). This list indicates scrambling codes of cells for which the SRNC has all the required information to initiate mobility. Once a user equipment reports one of the PSCs in the NCL, the RNC can immediately generate the mobility signaling towards the target RNC. However, it has to be noted that the NCL has a very limited size. For intra-frequency cells, the NCL is limited to 31 entries and for inter-frequency cells it is limited to 32 entries. Therefore, it would be unfeasible to include all the cells in a given neighborhood (CSG cells, small cells, macro cells etc.) in the NCL.

In R3-112600, "legacy UE Macro to HNB Active Hand-in", Qualcomm et al, and R3-112026, "Macro to small cell, metro cell Hand-in", Alcatel Lucent et al, solutions to support mobility of legacy user equipments to small cells in need of disambiguation are presented. An update of these solutions resulted in the solution captured in section 6.1.3.3.1.3 "Option 1c: Disambiguation at HNB-GW (UE UL detection+ $\Delta$OTD Filtering)" of TR37.803v1.2.0, "Mobility Enhancements for H(e)NB" (Release 11). The method followed in the latter document consists of the following main aspects:

1) A legacy user equipment sends a Measurement Report Message to a SRNC including target cell PSC, OTD information (as defined in section 6.1.3.3.1.1.2 of TR37.803v1.2.0, "Mobility Enhancements for H(e)NB" (Release 11)), UE UL PSC and UL DPCCH chip offset with respect to the target cell frame boundary.

2) The SRNC sends a Relocation Message or Radio Link Setup Request Message to the HNB GW including the target cell PSC, OTD information, UE UL PSC and UL DPCCH chip offset.

3) Before the HNB GW sends the detect request to the target candidate cells, it should firstly filter the candidate target cells with $\Delta$OTD information, and the HNB-GW will distribute the handover user equipment information to the remaining candidate target cells. If no further ambiguity remains the detect procedure could be skipped and continue the normal handover.

The HNB GW acquires the candidate target cells based on the target cell PSC and OTD information, and then sends the user equipment UL PSC and UL DPCCH chip offset information from the SRNC to the candidate cells if there is still more than one candidate. The candidate target cell measure the uplink signal quality of the user equipment and respond with the measurement result to HNB GW.

After the candidate target cell receives the detect request, it establishes the Uplink synchronization using the synchronization procedure by means of the UL DPCCH chip offset. During the synchronization procedure the Uplink signal quality of the user equipment is used as the reference to select the target cell.

Additionally, after the successful inbound handover, the HNB GW could update the $\Delta$OTD information between the target HNB cell and the source macro cell. No additional Iuh signaling is brought to update the $\Delta$OTD information in HNB GW.

4) The HNB GW selects the best cell based on the measurement result (e.g. SIR) from candidate cells.

Figure 5:
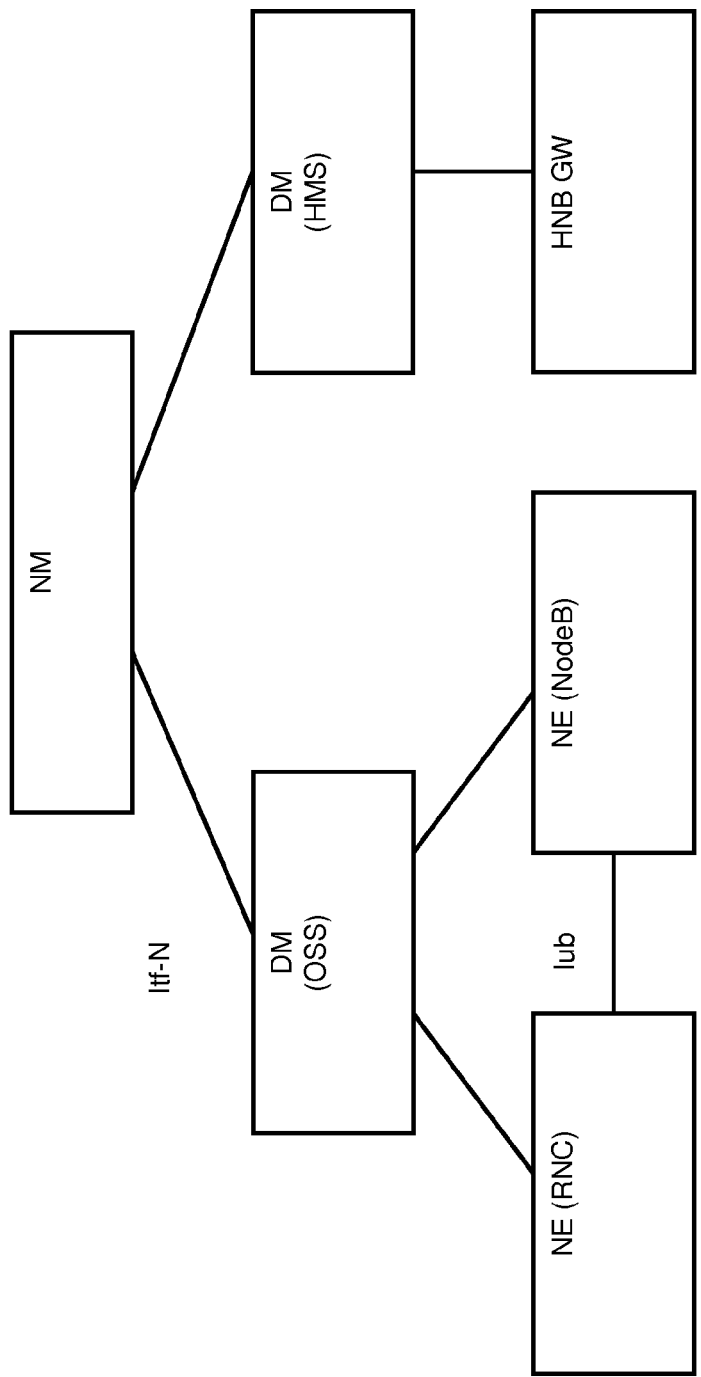
FIG. 5 is a schematic of a Network Management System.

The OAM system comprises logical components to manage each domain. Such domain managers include the Operation Support System to manage the UTRAN and the HNB Management System to manage the HNBs. The combined network domains are managed by the Network Management System (NMS) as illustrated by FIG. 5.

Overview of the Example Embodiments

Some of the example embodiments presented herein are directed towards the coordination of UL PSCs used by user equipments in proximity of a cell that might not be uniquely detectable as a target by the source RNC. The RNC serving cells neighboring one or more target cell in PSC confusion may become aware of the presence of such cells by means of, for example, mobility of non-legacy user equipments towards such cells and by means of measurement reports from legacy and non-legacy user equipments, revealing that there are multiple measured cells with the same PSC. Once the RNC is aware of this situation it may ensure that user equipments served by all the cells neighboring such cells in PSC confusion shall allocate unique UL PSC to the served user equipments.

Alternatively, if the cells neighboring the cells subject to PSC confusion span across multiple RNCs, some of the example embodiments propose to report user equipment measurements revealing the presence of PCS confusion to the OAM system and eventually to the NMS system. The OAM or NMS can therefore identify the cells across different RNCs for which UL PSCs need to be uniquely allocated and it can ensure that such PSCs are allocated accordingly, i.e., the OAM or NMS will allocate PSCs in a way that the risk of two user equipments, trying to be detected by a target cell, have the same UL PSC is minimized.

According to some of the example embodiments, the serving node, for example an RNC, may detect the presence of neighbor cells in need of disambiguation, for example in PSC or PCI confusion, in a number of ways. According to some of the example embodiments, the detection may be provided from legacy and non-legacy user equipment measurements indicating more than one measured cell with the same physical layer identity (e.g. same PSC or PCI). According to some of the example embodiments, the detection may be provided from configuration in the Neighbor Cell List (NCL) or Neighbor Relationship Table (NRT) of more than one cell with the same physical layer identity (e.g. same PSC or PCI). According to some of the example embodiments, the detection may also be provided from a configuration outside the NCL or the NRT of more than one neighbor cell with the same physical layer identity (e.g., a same PSC or PCI). According to some of the example embodiments, the detection may be provided from user equipment measurements reporting measured cells that have the same physical layer identity, for example a same PSC or PCI, as other configured cells not necessarily present in the user equipment measurement report.

Once the serving node or base station detects the presence of served user equipments which may be in the position of being handed over to target cells subject to physical layer identity confusion, the serving node may ensure allocation of unique UL physical layer identities, for example PSCs for DPCCH transmission, for all served user equipments.

A variation of the above comprises allocating an unique UL physical layer identity, for example, PSCs, only to those user equipments that are considered by the serving node to be in proximity of cells subject to physical layer identity confusion. If the number of UL physical layer identities is not sufficient to ensure their uniqueness across relevant user equipments, the serving node may reallocate UL physical layer identities by ensuring that two user equipments in proximity of the same cells subject to physical layer identity confusion or ambiguity do not have the same UL physical layer identity. The latter can be achieved in a number of ways.

According to some of the example embodiments, the serving node or base station may acquire knowledge of the position of cells in physical layer identity confusion with knowledge of the user equipment position and with user equipment measurement reports. According to some of the example embodiments, the serving node or base station may acquire knowledge of the position of cells in physical layer identity confusion by means of configuration from the OAM system. Hence, the serving node may reuse UL physical layer identities (e.g. UL PSCs) for user equipments with enough geographical separation.

According to some of the example embodiments, the cells neighboring cells subject to physical layer identity confusion are served by different nodes. In this case, the coordination of UL physical layer identities allocation may be performed by the OAM or NMS system. The OAM or NMS system becomes aware of the existence of cells in physical layer identity confusion by one of the following means: (1) from legacy and non-legacy user equipment measurements indicating more than one measured cell with the same physical layer identity and reported to OAM/NMS; (2) from cell configuration information received by connected nodes (e.g., RNCs, HNB GWs, etc.), in case of awareness at OAM systems, or received by connected OAM, in case of awareness at NMS systems; or (3) from measurements reported by the connected node (e.g., an RNCs, HNB, HNB GW, HeNB, etc.) and made available at the OAM or NMS.

The OAM/NMS system may ensure that UL physical layer identities are allocated uniquely to those user equipments in proximity of cells in physical layer identity confusion by the same means described above for a single RNC.

According to some of the example embodiments, the serving node (e.g., RNC) may be able to evaluate the user equipment mobility state, e.g., user equipment speed, position, direction of movement, and to use such information to either alter the measurements (such as DPCCH Chip Offset measurements) or to prevent their transmission from serving node to target node (e.g., HNB GW) for the purpose of target cell disambiguation.

Figure 6:
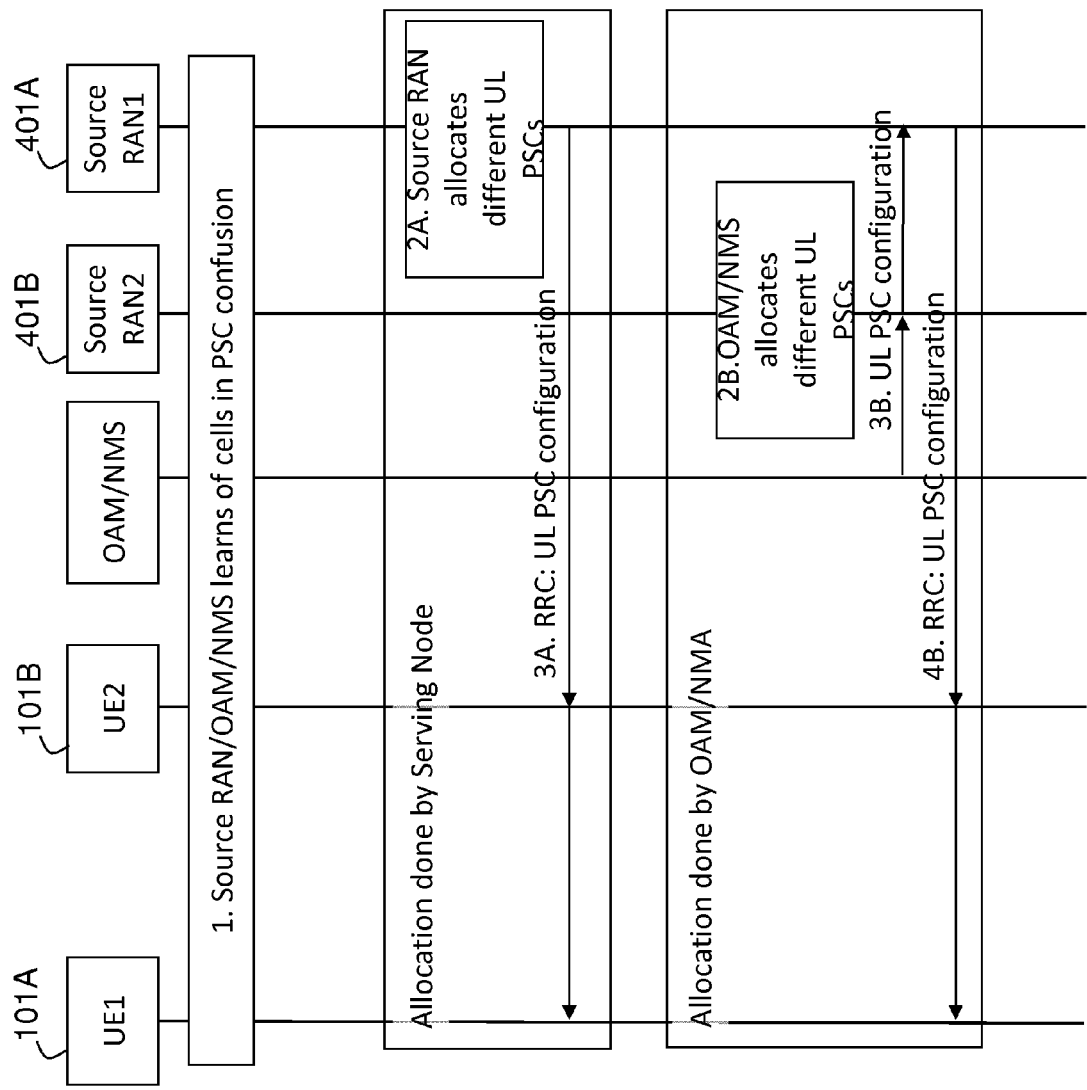
FIG. 6 is a messaging diagram illustrating some of the example embodiments presented herein.

FIG. 6 provides an illustrative example of how some of the example embodiments presented herein may be implemented in terms of signaling between the various network nodes. First, a RAN/OAM/NMS node or system may learn of the existence of cells in PSC confusion, for example, via user equipment provided measurements and/or configuration information. Specifically, the OAM/NMS or the source 401A or target 401B base stations may discover a physical layer ambiguity among the first 101A and second 101B user equipments (step 1). The detection may be performed via any means described herein.

According to some of the example embodiments, it is the source base station which provides the unique physical layer identity allocation. The source base station 401A may assign a unique physical layer identity to each of the user equipments served by the base station 401 A or to a sub-set of user equipments that may be in proximity to the possible ambiguity (step 2). This assignment may be communicated to the user equipments 101A and/or 101B, for example, via RRC signaling (step 3).

According to some of the example embodiments, it is the OAM/NMS system which provides the unique physical layer identity allocation. The OAM/NMS system may also provide a unique physical layer identity to each of the user equipments, or to a sub-set of the user equipments, served by the base station 401A. The OAM/NMS system may also, or alternatively, provide different sub-ranges of physical layer identities to different source base stations. The physical layer identities may be assigned to base stations based on their location. Thus, two base stations which are is close proximity to one another may not assign the same physical layer identity to different user equipments.

Example Node Configuration

Figure 7:
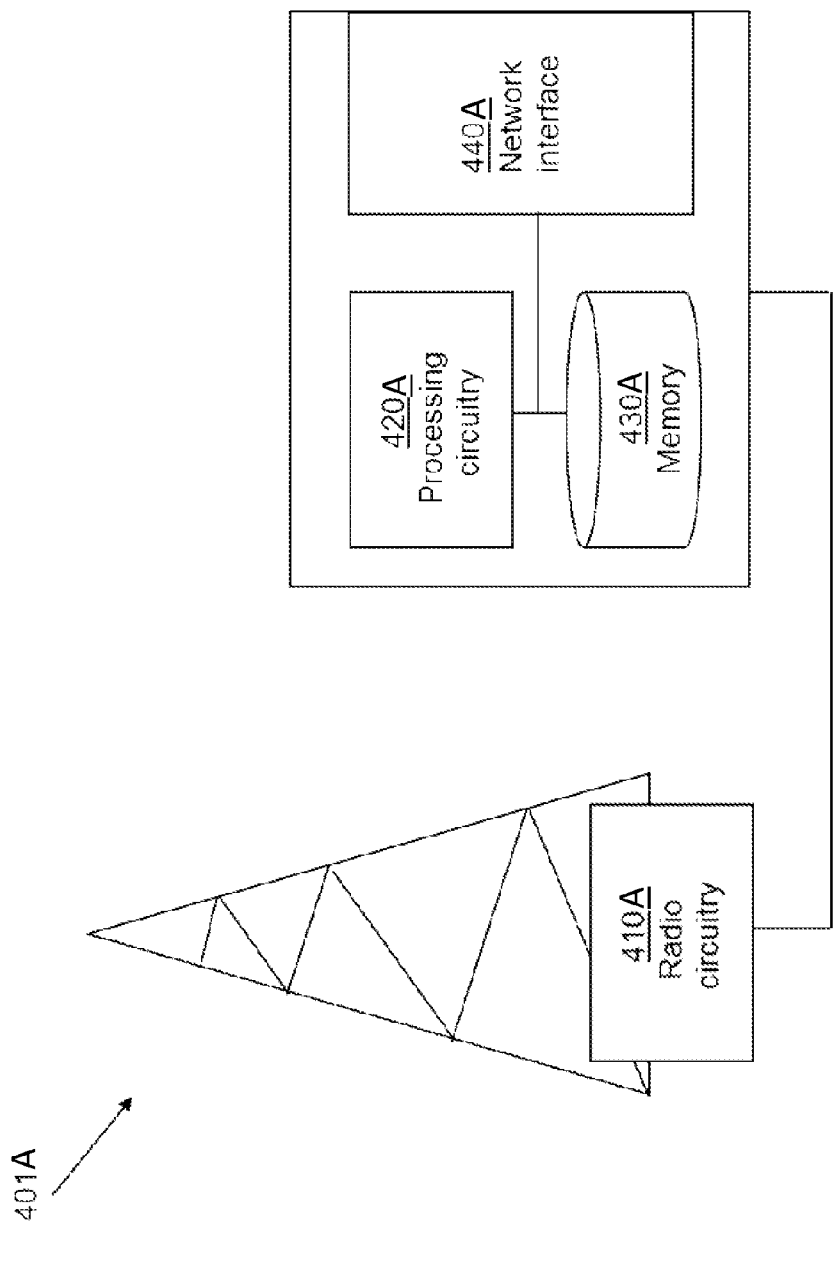
FIG. 7 is an example node configuration of a serving base station, according to some of the example embodiments presented herein.

FIG. 7 illustrates an example node configuration of a source base station 401A which may perform some of the example embodiments described herein. The source base station 401A may comprise radio circuitry or a communication port 410A that may be configured to receive and/or transmit communication data, instructions, and/or messages. It should be appreciated that the radio circuitry or communication port 410A may be comprised as any number of transceiving, receiving, and/or transmitting units or circuitry. It should further be appreciated that the radio circuitry or communication 410A may be in the form of any input or output communications port known in the art. The radio circuitry or communication 401A may comprise RF circuitry and baseband processing circuitry (not shown).

The source base station 401A may also comprise a processing unit or circuitry 420A which may be configured to assign an uplink physical layer identity for a user equipment uplink transmission. The processing circuitry 420A may be any suitable type of computation unit, e.g. a microprocessor, digital signal processor (DSP), field programmable gate array (FPGA), or application specific integrated circuit (ASIC), or any other form of circuitry. The source base station 401A may further comprise a memory unit or circuitry 430A which may be any suitable type of computer readable memory and may be of volatile and/or non-volatile type. The memory 430A may be configured to store received, transmitted, and/or measured data, device parameters, communication priorities, and/or executable program instructions.

Figure 8:
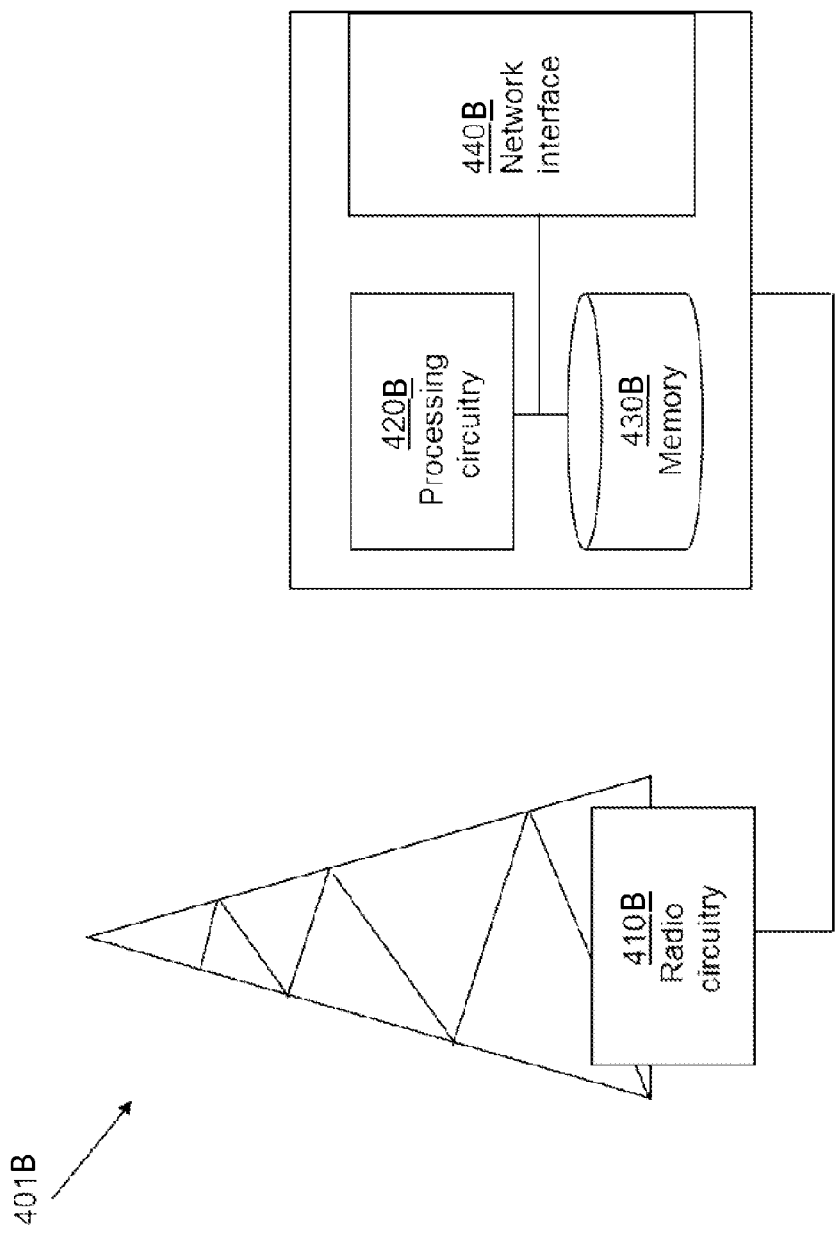
FIG. 8 is an example node configuration of a target base station, according to some of the example embodiments presented herein.

FIG. 8 illustrates an example node configuration of a target base station 401B which may perform some of the example embodiments described herein. The target base station 401B may comprise radio circuitry or a communication port 410B that may be configured to receive and/or transmit communication data, instructions, and/or messages. It should be appreciated that the radio circuitry or communication port 410B may be comprised as any number of transceiving, receiving, and/or transmitting units or circuitry. It should further be appreciated that the radio circuitry or communication 410B may be in the form of any input or output communications port known in the art. The radio circuitry or communication 410B may comprise RF circuitry and baseband processing circuitry (not shown).

The target base station 401B may also comprise a processing unit or circuitry 420B which may be configured to monitor an identified application and detect a usage of the identified application. The processing circuitry 420B may be any suitable type of computation unit, e.g. a microprocessor, digital signal processor (DSP), field programmable gate array (FPGA), or application specific integrated circuit (ASIC), or any other form of circuitry. The target base station 401B may further comprise a memory unit or circuitry 430B which may be any suitable type of computer readable memory and may be of volatile and/or non-volatile type. The memory 430B may be configured to store received, transmitted, and/or measured data, device parameters, communication priorities, and/or executable program instructions.

Example Node Operations

Figure 9:
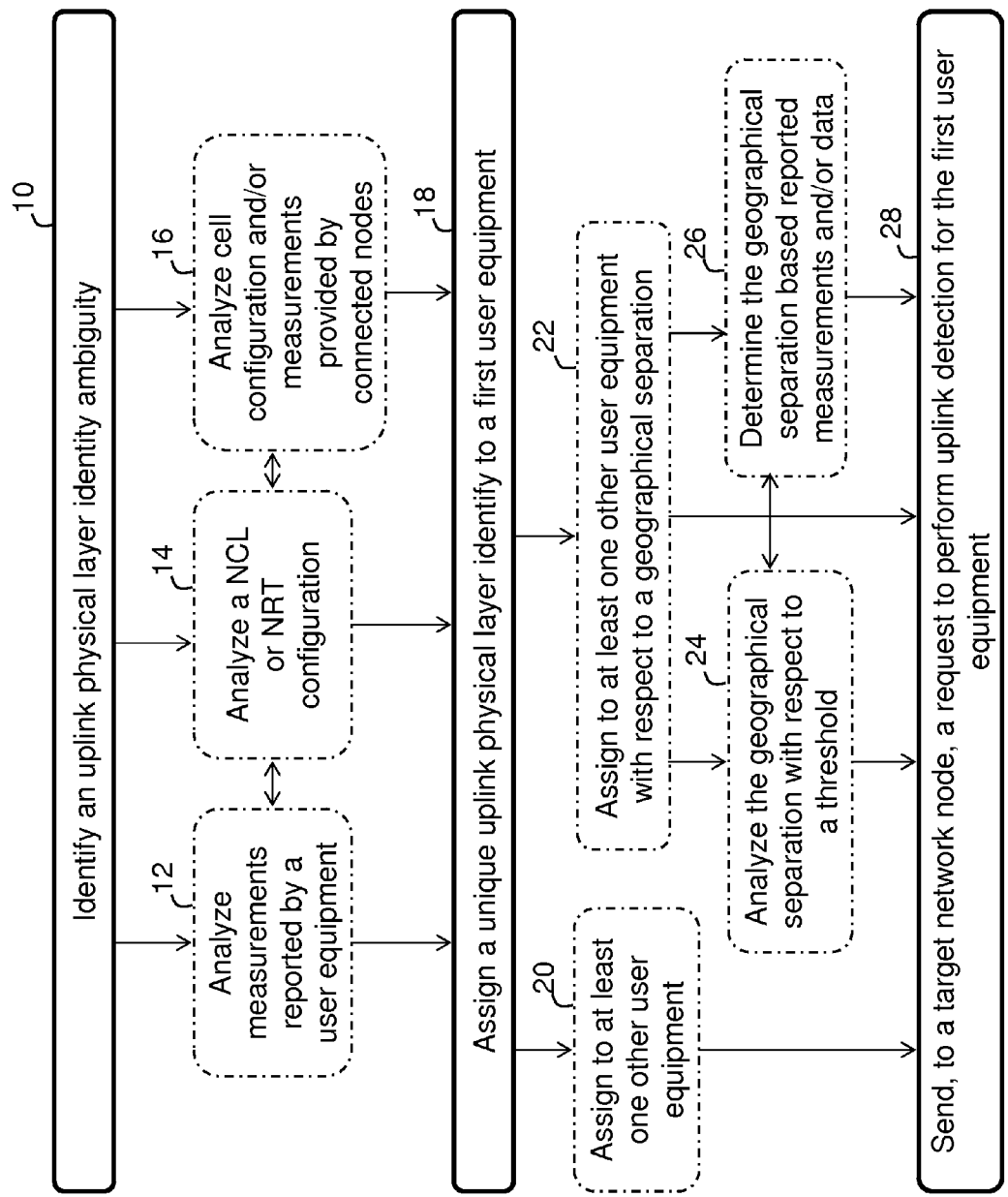
FIG. 9 is a flow diagram depicting example operations which may be taken by the source base station of FIG. 7, according to some of the example embodiments presented herein.

FIG. 9 is a flow diagram depicting example operations which may be taken by the source base station 401A of FIG. 7 for assigning an uplink physical layer identity for a user equipment uplink transmission of a first user equipment being served by the source network node. It should also be appreciated that FIG. 9 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. The example operations will be explained using the example network elements provided in FIGS. 1, 2, 7 and 8.

Operation 10

The source network node 401A is configured to identify 10 that an uplink physical layer identity for the first user equipment 101A is equal to an uplink physical layer identity for at least one second user equipment 101B. The first user equipment 101A is in proximity to a non-serving cell 105. The at least one second user equipment 101B is in proximity to, or is being served by, the non-serving cell 105. The processing circuitry 420A is configured to identify that the uplink physical layer identity for the first user equipment 101A is equal to an uplink physical layer identity for at least one second user equipment 101B. According to some of the example embodiments, the uplink physical layer identity may be a Primary Scrambling Code (PSC) or a Physical Cell Identity (PCI).

Thus, as explained in relation to FIGS. 1 and 2, the source network node 401A may find that a first user equipment 101A may have the same physical layer identity as a second user equipment 101B. Thus, in performing uplink measurements, the physical layer identity ambiguity may cause uplink measurements to mistakenly be obtained for the second user equipment 101B rather than the first user equipment 101A. It should further be appreciated that the term proximity to a cell may be interpreted as being able to receive or transmit communications from or to a node within the cell.

Example Operation 12

According to some of the example embodiments, the identifying 10 may further comprise analyzing 12 measurements reported from at least one user equipment. The measurements may be related to at least one cell that has a same physical layer identity as that of at least one other configured cell. The processing circuitry 420A may be configured to analyze the measurements reported form at least one user equipment. It should be appreciated that the at least one user equipment described in example operation 12 may be the first user equipment, the second user equipment, or any other user equipment within the wireless network.

Example Operation 14

According to some of the example embodiments, the identifying 10 may further comprise analyzing 14 a configuration of a NCL or NRT. The NCL or NRT may comprise a listing of uplink physical layer identities used by user equipments in proximity to the non-serving cell. The processing circuitry 420A may be configured to analyze a configuration of the NCL or NRT. It should be appreciated that the user equipments described in example operation 12 may be the first user equipment, the second user equipment, or any other user equipment within the wireless network.

Example Operation 16

According to some of the example embodiments, the identifying 10 may further comprise analyzing 16 cell configuration information and/or measurements provided by nodes connected to the serving network node. The processing circuitry 420A may be configured to analyze cell configuration information and/or measurements provided by nodes connected to the serving network node. Examples of such nodes may be RNCs, eNBs, Home NodeB Gateways, Home NodeB Gateways Home NodeB and Home eNodeB.

Operation 18

The source network node 401A is further configured to assign 18 a unique uplink physical layer identity to the first user equipment 101A such that the unique uplink physical layer identity of the first user equipment 101A does not equal the uplink physical layer identity of the at least one second user equipment. The processing circuitry 420A is configured to assign the unique uplink physical layer identity to the first user equipment 101A. Thus, the unique assigning removes the physical layer identity ambiguity between the first and at least one second user equipment.

Example Operation 20

According to some of the example embodiments, the assigning 18 may further comprise assigning 20 an unique uplink physical layer identity to at least one other user equipment that is in proximity to the non-serving cell. The processing circuitry 420A may be configured to assign an unique uplink physical layer identity to the at least one other user equipment that is in proximity to the non-serving cell. It should further be appreciated that the unique assigning may be provided for any number of user equipments within the wireless network node.

Example Operation 22

According to some of the example embodiments, the assigning may further comprise assigning 22 a same unique uplink physical layer identity to at least one other user equipment with a geographical separation with respect to the first user equipment. The processing circuitry 420A may be configured to assign the same unique uplink physical layer identity to at least one other user equipment with a geographical separation with respect to the first user equipment.

Due to the limited number of physical layer identities, a same physical layer identity may be needed to be used among two different user equipments. Thus, this duplicate assignment may be made to user equipments with a geographical separation. The geographical separation may ensure that a physical layer identity ambiguity will not occur since the user equipments will the same physical layer identity will not both be in proximity to a cell for which uplink measurements will be made in relation to.

Example Operation 24

According to some of the example embodiments, the assigning 22 may further comprise analyzing 24 the geographical separation with respect to a programmable threshold. The processing circuitry 420A may be configured to analyze the geographical separation with respect to a programmable threshold. It should be appreciated that the geographical separation may be evaluated or determined by any other means known in the art.

Example Operation 26

According to some of the example embodiments, the assigning 22 may further comprise determining 26 the geographical separation via user equipment measurement reports comprising user equipment or cell positioning information and/or an OAM configuration comprising cell positioning information. The processing circuitry 420A is configured to determine the geographical separation via the user equipment measurement reports comprising user equipment or cell positioning information and/or an OAM configuration comprising cell positioning information. It should be appreciated that the geographical separation may be evaluated or determined by any other means known in the art.

Operation 28

The source network node 401A is further configured to initiate 28 uplink detection for the first user equipment 101A using the unique uplink physical layer identity. The processing circuitry 420A is configured to initiate the uplink detection for the first user equipment using the unique uplink physical layer identity.

Example Operation 29

According to some of the example embodiments, the non-serving cell 105 is served by the source network node 401A. In such example embodiments, the initiating 28 may further comprise performing 29 the uplink detection within the source network node 401A. The processing circuitry 420A may be configured to perform the uplink detection within the source network node 401A. This example situation is illustrated in FIG. 1. As shown in FIG. 1, the source network node 401A serves the non-serving cell 105. Thus, the source network node 401 A will initiate the uplink measurements itself.

Example Operation 31

According to some of the example embodiments, the non-serving cell 105 is severed by a target network node 401B. In such example embodiments, the initiating 29 further comprises sending 31, to the target network node 401B, a request to perform the uplink detection. The request comprises the unique uplink physical layer identity. The radio circuitry 410A may be further configured to send, to the target network node 401B, the request to perform the uplink detection. According to some of the example embodiments, the request may be a relocation or a radio link setup request. This example situation is illustrated in FIG. 2. As shown in FIG. 2, the target network node 401B serves the non-serving cell 105. Thus, the source network node 401 A will initiate the uplink measurements by sending a request to the target network node 401B. According to some of the example embodiments, the request may be a relocation request or a cell activation request.

Figure 10:
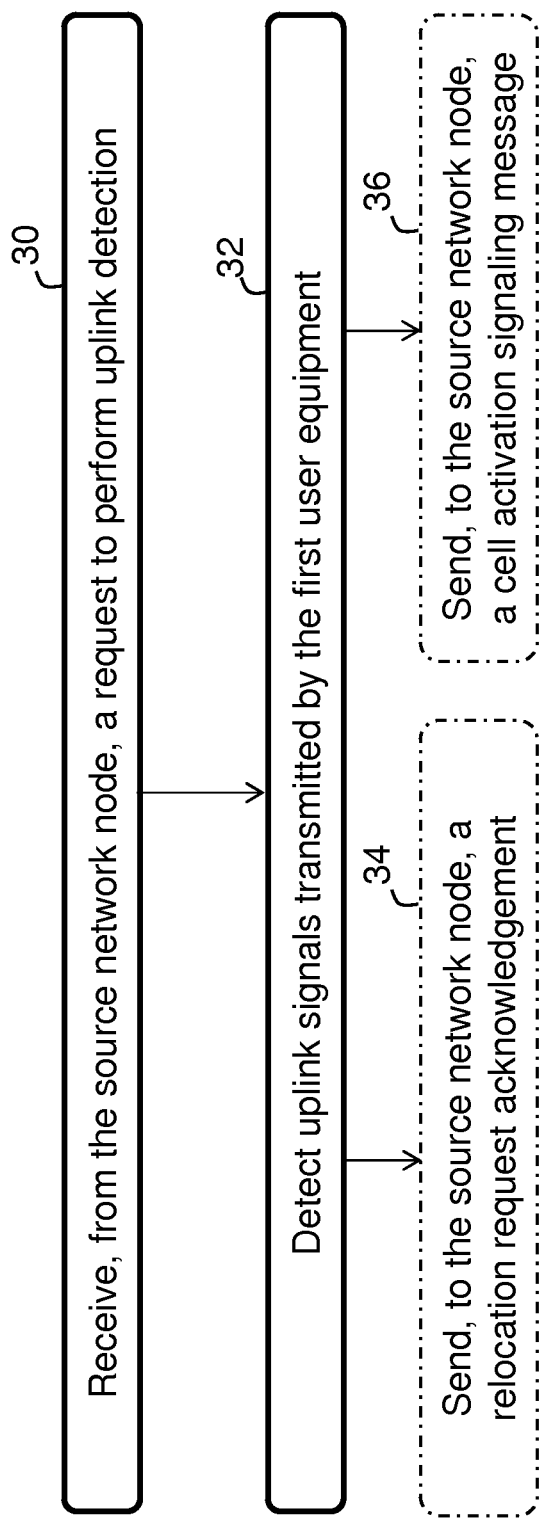
FIG. 10 is a flow diagram depicting example operations which may be taken by the target base station of FIG. 8, according to some of the example embodiments presented herein.

FIG. 10 is a flow diagram depicting example operations which may be taken by the target base station 401B of FIG. 8 for performing uplink detection for a first user equipment. It should also be appreciated that FIG. 10 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. The example operations will be explained using the example network elements provided in FIGS. 1, 2, 7 and 8.

Operation 30

The target network node 401B is configured to receive 30, from a serving network node 401A, a request to perform uplink detection for a first user equipment 101A being served by the serving network node 401A. The request comprises an unique uplink physical layer identity assigned to the first user equipment. The first user equipment is in proximity to a non-serving cell 105 that is served by the target network node 401B. An uplink physical layer identity of at least one second user equipment 101B was previously in ambiguity with an uplink physical layer identity of the first user equipment 101A. The at least one second user equipment is in proximity to or is being served by the non-serving cell 105. The radio circuitry 410B is configured to receive, from the serving network node, the request to perform uplink detection for the first using equipment 101A being served by the serving network node 401A. According to some of the example embodiments, the uplink physical layer identity is a PSC or a PCI.

It should be appreciated that the previously ambiguity of the physical layer identity between the first and second user equipments is explained in relation to FIG. 2. The assignment of the unique physical layer identity assures that the target network node 401B will not mistakenly obtain measurements from the second user equipment when performing uplink measurements for the first user equipment.

Operation 32

The target network node 401B is further configured to detect 32 uplink signals transmitted by the first user equipment 101A using the unique uplink physical layer identity. The processing circuitry 420B is configured to detect the uplink signals transmitted by the first user equipment 101A using the unique uplink physical layer identity.

Example Operation 34

According to some of the example embodiments, the request to perform uplink detection is a relocation or a radio link setup request. In such example embodiments, the target network node may be further configured to send 34, to the serving network node, a relocation request acknowledgment message. The relocation request acknowledgment message may comprise the results of the uplink detection. The radio circuitry 410B may be configured to send, to the serving network node, the relocation request acknowledgment message.

Example Operation 36

According to some of the example embodiments, the target network node 401B may further be configured to send 36, to the serving network node 401A, a cell activation signaling message for activating a new cell in proximity to the first user equipment 101A. The cell activation request may comprise results of the uplink detection. The radio circuitry 410B may be configured to send, to the serving network node 401A, the cell activation signaling message for activating a new cell in proximity to the first user equipment.

CONCLUSION

It should be noted that although terminology from 3GPP LTE has been used herein to explain the example embodiments, this should not be seen as limiting the scope of the example embodiments to only the aforementioned system. Other wireless systems, comprising WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices.

The various example embodiments described herein are described in the general context of method steps or processes, which may be implemented in one aspect by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a source network node, for assigning an uplink physical layer identity for a user equipment uplink transmission of a first user equipment being served by the source network node, the method comprising:
   identifying that an uplink physical layer identity for the first user equipment is equal to an uplink physical layer identity for at least one second user equipment, wherein the first user equipment is in proximity to a non-serving cell and the at least one second user equipment is in proximity to or being served by the one non-serving cell;
   assigning a unique uplink physical layer identity to the first user equipment such that the unique uplink physical layer identity of the first user equipment does not equal the uplink physical layer identity of the at least one second user equipment; and
   initiating uplink detection for the first user equipment, using the unique uplink physical layer identity,
   wherein the uplink physical layer identity is a Primary Scrambling Code, PSC, or a Physical Cell Identity, PCI.

2. The method of claim 1, wherein the non-serving cell is served by the source network node and said initiating further comprises performing said uplink detection within the source network node.

3. The method of claim 1, wherein the non-serving cell is served by a target network node and said initiating further comprises sending, to the target network node, a request to perform the uplink detection, said request comprising the unique uplink physical layer identity.

4. The method of claim 3, wherein the request is a relocation or radio link setup request.

5. The method of claim 1, wherein the identifying further comprises analyzing measurements, reported from at least one user equipment, wherein said measurements are related to at least one cell that has a same physical layer identity as that of at least one other configured cell.

6. The method of claim 1, wherein the identifying further comprises analyzing a configuration of a Neighbor Cell List, NCL, or Neighbor Relationship Table, NRT, said NCL or NRT comprising a listing of uplink physical layer identities used by the non-serving cell and the at least one other neighboring cell.

7. The method of claim 1, wherein the identifying further comprises analyzing cell configuration information and/or measurements provided by nodes connected to the serving network node.

8. The method of claim 1, wherein the assigning further comprises assigning a unique uplink physical layer identity to at least one other user equipment that is in proximity to the non-serving cell and/or the at least one neighboring cell.

9. The method of claim 1, wherein the assigning further comprises assigning a same unique uplink physical layer identity to at least one other user equipment with a geographical separation with respect to the first user equipment.

10. The method of claim 9, further comprising analyzing said proximity and/or geographical separation with respect to a programmable threshold.

11. The method of claim 9, further comprising determining said geographical separation via user equipment measurement reports comprising user equipment or cell positioning information and/or an Operations and Maintenance, OAM, configuration comprising cell positioning information.

12. A source network node for assigning an uplink physical layer identity for a user equipment uplink transmission of a first user equipment being served by the source network node, the source network node comprising:
processing circuitry configured to identify that an uplink physical layer identity for the first user equipment is equal to an uplink physical layer identity for at least one second user equipment, wherein the first user equipment is in proximity to a non-serving cell and the at least one second user equipment is in proximity to or being served by the one non-serving cell;
the processing circuitry further configured to assign a unique uplink physical layer identity to the first user equipment such that the unique uplink physical layer identity of the first user equipment does not equal the uplink physical layer identity of the at least one second user equipment; and
radio circuitry configured to initiate uplink detection for the first user equipment using the unique uplink physical layer identity
wherein the uplink physical layer identity is a Primary Scrambling Code, PSC, or a Physical Cell Identity, PCI.

13. The source network node of claim 12, wherein the non-serving cell is served by the source network node and the processing circuitry is further configured to perform said uplink detection within the source network node.

14. The method of claim 12, wherein the non-serving cell is served by a target network node and the radio circuitry is further configured to send, to the target network node, a request to perform the uplink detection, said request comprising the unique uplink physical layer identity.

15. The source network node of claim 14, wherein the request is a relocation or radio link setup request.

16. The source network node of claim 12, wherein the processing circuitry is further configured to analyze measurements, reported from at least one user equipment, wherein said measurements are related to at least one cell that has a same physical layer identity as that of at least one other configured cell.

17. The source network node of claim 12, wherein the processing circuitry is further configured to analyze a configuration of a Neighbor Cell List, NCL, or Neighbor Relationship Table, NRT, said NCL or NRT comprising a listing of uplink physical layer identities used by the non-serving cell and the at least one other neighboring cell.

18. The source network node of claim 12, wherein the processing circuitry is further configured to analyze cell configuration information and/or measurements provided by at least one node connected to the serving network node.

19. The source network node of claim 12, wherein the processing circuitry is further configured to assign a unique uplink physical layer identity to at least one other user equipment that is in proximity to the non-serving cell and/or the at least one other neighboring cell.

20. The source network node of claim 12, wherein the processing circuitry is further configured to assign a same unique uplink physical layer identity to at least one other user equipment with a geographical separation with respect to the first user equipment.

21. The source network node of claim 20, wherein the processing circuitry is further configured to analyze said proximity and/or geographical separation with respect to a programmable threshold.

22. The source network node of claim 20, wherein the processing circuitry is further configured to determine said geographical separation via user equipment measurement reports comprising user equipment or cell positioning information and/or an Operations and Maintenance, OAM, configuration comprising cell positioning information.

23. The source network node of claim 22, wherein the at least one node connected to the serving network node is a base station, relay, Node B, eNode B, Radio Network Controller, RNC, home Node B gateway, home eNodeB gateway, and/or an Operation and Maintenance, OAM, node.

24. The source network node of claim 12, wherein the source network node is a base station, RNC, relay, Node B, eNode B, and/or said source network comprises an Operations and Maintenance, OAM, and a Network Management System, NMS.

25. A method in a target network node for performing uplink detection for a first user equipment, the method comprising:
receiving, from a serving network node, a request to perform uplink detection for a first user equipment being served by the serving network node, said request comprising a unique uplink physical layer identity assigned to the first user equipment, said first user equipment being in proximity of a non-serving cell served by the target network node, wherein an uplink physical layer identity of at least one second user equipment was previously in ambiguity with an uplink physical layer identity of the first user equipment, wherein said at least one second user equipment is in proximity to or being served by the non-serving cell; and
detecting uplink signals transmitted by the first user equipment using the unique uplink physical layer identity, wherein the uplink physical layer identity is a Primary Scrambling Code, PSC, or a Physical Cell Identity, PCI.

26. The method of claim 25, wherein the request to perform uplink detection is a relocation or a radio link setup request, the method further comprising sending, to the serving network node, a relocation request acknowledgement message, said relocation acknowledgement message comprising results of the uplink detection.

27. The method of claim 25, further comprising sending, to the serving network node, a cell activation signaling message for activating a new cell in proximity to the first user equipment, said cell activation signaling message comprising results of the uplink detection.

28. A target network node for performing uplink detection for a first user equipment, the target network node comprising:
   radio circuitry configured to receive, from a serving network node, a request to perform uplink detection for a first user equipment being served by the serving network node, said request comprising a unique uplink physical layer identity assigned to the first user equipment, said first user equipment being in proximity of a non-serving cell served by the target network node, wherein an uplink physical layer identity of at least one second user equipment was previously in ambiguity with an uplink physical layer identity of the first user equipment, wherein said at least one second user equipment is in proximity to or being served by the non-serving cell processing circuitry further configured to detect uplink signals transmitted by the first user equipment using the unique uplink physical layer identity,
   wherein the uplink physical layer identity is a Primary Scrambling Code, PSC, or a Physical Cell Identity, PCI.

29. The target network node of claim 28, wherein the source network node is a base station, RNC, relay, Node B, eNode B, and/or said source network comprises an Operations and Maintenance, OAM, and a Network Management System, NMS.

30. The target network node of claim 28, wherein the target network node is a home eNodeB gateway or a base station.

31. The target network node of claim 28, wherein the request to perform uplink detection is a relocation or a radio link setup request, the radio circuitry being further configured to send, to the serving network node, a relocation request acknowledgement message, said relocation acknowledgement message comprising results of the uplink detection.

32. The target network node of claim 28, wherein the radio circuitry is further configured to send, to the serving network node, a cell activation signaling message for activating a new cell in proximity to the first user equipment, said cell activation signaling message comprising results of the uplink detection.

* * * * *

UNITED STATES PATENT AND TRADEMARK OFFICE
CERTIFICATE OF CORRECTION

| | | |
|---|---|---|
| PATENT NO. | : 9,049,002 B2 | Page 1 of 1 |
| APPLICATION NO. | : 13/881893 | |
| DATED | : June 2, 2015 | |
| INVENTOR(S) | : Kazmi et al. | |

It is certified that error appears in the above-identified patent and that said Letters Patent is hereby corrected as shown below:

On Page 2, item (56), References Cited under "OTHER PUBLICATIONS", in Column 1, Line 10, delete "Zhubai, China," and insert -- Zhuhai, China, --, therefor.

In the specification

In Column 11, Line 4, delete "401A may" and insert -- 410A may --, therefor.

In the claims

In Column 17, Line 58, in Claim 12, delete "identity" and insert -- identity, --, therefor.

In Column 17, Line 65, in Claim 14, delete "method" and insert -- source network node --, therefor.

Signed and Sealed this
Seventeenth Day of November, 2015

Michelle K. Lee
*Director of the United States Patent and Trademark Office*